United States Patent [19]

Ludington et al.

[11] Patent Number: 5,444,236
[45] Date of Patent: Aug. 22, 1995

[54] MULTICOLOR RADIATION DETECTOR METHOD AND APPARATUS

[75] Inventors: David Ludington, Amherst, N.H.; John Merchant, Needham, Mass.

[73] Assignee: Loral Infrared & Imaging Systems, Inc., Lexington, Mass.

[21] Appl. No.: 208,640

[22] Filed: Mar. 9, 1994

[51] Int. Cl.⁶ .............................................. H01J 40/14
[52] U.S. Cl. ................... 250/208.1; 250/226; 250/216; 356/419
[58] Field of Search ............... 250/208.1, 216, 226, 250/234, 332, 339.02; 359/559, 589; 356/407, 416, 419

[56] References Cited

U.S. PATENT DOCUMENTS

| | | | |
|---|---|---|---|
| 3,944,167 | 3/1976 | Figler et al. | 244/3.16 |
| 4,325,616 | 4/1982 | Dietz | 354/27 |
| 4,358,186 | 11/1982 | Johnson et al. | 354/27 |
| 4,474,441 | 10/1984 | Millard | 354/413 |
| 4,663,656 | 5/1987 | Elabd et al. | 358/75 |
| 4,675,532 | 6/1987 | Carson | 250/332 |
| 4,996,427 | 2/1991 | Noble et al. | 250/226 |
| 5,113,076 | 5/1992 | Schulte | 250/370.06 |
| 5,373,151 | 12/1994 | Eckel, Jr. et al. | 250/208.1 |

*Primary Examiner*—Stephone B. Allen
*Attorney, Agent, or Firm*—Leone & Moffa

[57] ABSTRACT

A two color radiation detector. A dispersive lens with a spectrally selective central obscuration focuses a first radiation band on a central location on focal plane array. The dispersive lens also focuses an annulus of out of focus radiation of a second radiation band concentric with the central location on the focal plane array. For point target detection the dispersive lens transmits plume band and guard band radiation to the staring focal plane array sensor. The staring focal plane array is located at the focal point of the plume band radiation. A spatial filter detects target signatures using information from the plume band and guard band radiation.

22 Claims, 5 Drawing Sheets

|   |   |   |   |   |   |   |
|---|---|---|---|---|---|---|
|   |   |   |   |   |   |   |
|   |   |   |   |   |   |   |
|   |   |   | 2 |   |   |   |
|   |   | 2 | 10| 2 |   |   |
|   |   |   | 2 |   |   |   |
|   |   |   |   |   |   |   |
|   |   |   |   |   |   |   |

Fig. 3

|   |   | 3 | 5 | 3 |   |   |
|---|---|---|---|---|---|---|
|   | 6 | 7 | 5 | 7 | 6 |   |
| 3 | 8 |   |   |   | 8 | 3 |
| 5 | 5 |   |   |   | 5 | 5 |
| 3 | 8 |   | 2 |   | 8 | 3 |
|   | 6 | 7 | 5 | 7 | 6 |   |
|   |   | 3 | 5 | 3 |   |   |

Fig. 4

|  |  |  |  |  |  |  |  |  |
|---|---|---|---|---|---|---|---|---|
|  |  |  |  |  |  |  |  |  |
|  |  |  |  |  |  |  |  |  |
|  |  |  |  |  |  |  |  |  |
|  |  |  | −4.5 | 2 | −4.5 |  |  |  |
|  |  |  | 2 | 10 | 2 |  |  |  |
|  |  |  | −4.5 | 2 | −4.5 |  |  |  |
|  |  |  |  |  |  |  |  |  |
|  |  |  |  |  |  |  |  |  |
|  |  |  |  |  |  |  |  |  |

*Fig. 5*

|  |  |  | −3 | −5 | −3 |  |  |  |
|---|---|---|---|---|---|---|---|---|
|  |  | −7 | 3 | 5 | 3 | −7 |  |  |
|  | −7 | 6 | 7 | 5 | 7 | 6 | −7 |  |
| −3 | 3 | 8 | −12 |  | −12 | 8 | 3 | −3 |
| −5 | 5 | 5 | 5 |  | 5 | 5 | 5 | −5 |
| −3 | 3 | 8 | −12 |  | −12 | 8 | 3 | −3 |
|  | −7 | 6 | 7 | 5 | 7 | 6 | −7 |  |
|  |  | −7 | 3 | 5 | 3 | −7 |  |  |
|  |  |  | −3 | −5 | −3 |  |  |  |

*Fig. 6*

MULTICOLOR RADIATION DETECTOR METHOD AND APPARATUS

BACKGROUND OF THE INVENTION

1. Field of the Invention

The invention relates to a radiation detector and, more particularly, to an apparatus for simultaneously deriving multiple images from a focal plane array over different spectral bands.

2. Discussion of the Prior Art

In the prior art, systems that generate multiple spectral bands have either employed scanning sensors or staring sensors. Scanning sensors are readily adaptable to generating multiple spectral bands. However, scanning sensors are large, have low update rates, and are mechanically complex, making them unsuitable for many applications. Staring sensors are small, have fast update rates, and are mechanically simple. However, in order to obtain multiple spectral bands, the prior art combined staring sensors with multiple arrays, checkerboard filters and moving focus spectrometers. These modifications added to the size of the prior art systems, while decreasing the speed and simplicity of those systems.

The intensity at each point in the image from a staring focal plane array (FPA) camera is proportional to the radiant intensity, over the spectral band of the FPA, of the corresponding point in the object scene. For example, with an FPA sensitive over the spectral band from 3 to 5 microns the camera will generate a single medium wave (MW) IR image. In some applications it is desirable to have two, spectrally distinct, images of the scene: for example one image showing the scene over one band, for example 3.0–3.8 microns, and another showing the scene over another, different band, for example 4.2–5.0 microns.

Therefore, it is a motive of the invention to simultaneously derive two different spectral band images of the object scene from one camera sensitive over both spectral bands.

SUMMARY OF THE INVENTION

The invention provides a dispersive lens with a central obscuration transmissive in a first spectral band of radiation. The lens focuses the first spectral band of radiation on a focal plane array. The lens also provides the focal plane with radiation from a second band in the shape of an annulus, formed by the central obscuration. A processor attached to read information from the focal plane array filters the signals representing the first and second spectral bands to derive the multicolor image. Two spatial filters are matched to the expected spatial distribution patterns of the energy on the FPA originating from an object point. The first spatial filter is designed so that the first band is passed at unity gain and the second band is passed at zero gain. The second spectral filter does the opposite, passing the first band at zero gain and the second band at unity gain.

Other objects, features and advantages of the present invention will become apparent to those skilled in the art through the Description of the Preferred Embodiment, Claims, and Drawings herein wherein like numerals refer to like elements.

BRIEF DESCRIPTION OF THE DRAWINGS

To illustrate this invention, a preferred embodiment will be described herein with reference to the accompanying drawings.

FIGS. 3 and 4 respectively show examples of spread functions employed in a simulated dispersive multicolor filter sensor.

FIGS. 5 and 6 respectively show a chart of functions of a plume band spatial filter ($F\_P(i,j)$) and a guard band spatial filter ($F\_G (i,j)$).

DETAILED DESCRIPTION OF THE PREFERRED EMBODIMENT

The invention utilizes the dispersive property of a lens, specifically: focal length varies with wavelength. This property is normally suppressed, or color corrected, such that the lens sharply focuses an image over substantially the entire effective spectral band of a detector, such as a focal plane array (FPA). In the present invention, however, the lens is designed so that radiation over one band, for example 3.0–3.8 microns, from an object point is focused at the nominal focal distance while the radiation in the other band, for example 4.2–5.0 microns, is focused at a slightly different focal distance. When the FPA is located at the nominal focal distance, energy in one band is focused, while energy in the other band is then spread out into a blur circle. The central part of the lens is obscured, or apodised, so this blur circle is actually a blur annulus.

The radiant energy over the two bands, from any point in the object scene, is spatially distributed in two characteristically different ways over the FPA. Two spectrally different images are recovered from the one image that is read out from the camera by spatially filtering the image in two different ways. The spatial filter in each case, which may be designated as Filter1, Filter2, is an array of weights. The filtering action is performed by convolving the array with the image. The filters are matched to the expected spatial distribution patterns, which may be designated as Blur1, Blur2, of the energy on the FPA originating from an object point. This matching is designed so that, essentially, Filter1 passes Blur1 at unity gain and Blur2 at zero gain, while Filter2 passes Blur1 at zero gain and Blur2 at unity gain.

Multiple images over different spectral bands may be derived simultaneously from a single staring focal plane array camera. Multiple color information may then be recovered at a single focal plane of the staring sensor for further processing. The present invention makes use of the entire array of the staring focal plane array camera to measure the output of each band. The DMF significantly reduces the number of filters and lenses needed to generate multiple spectral bands.

Accordingly, the present invention provides a system which is simple, low cost and has no moving parts. The present invention simultaneously produces multiple two dimensional staring images having unique spectral bands without the need for a stripe filter.

Figure 1:
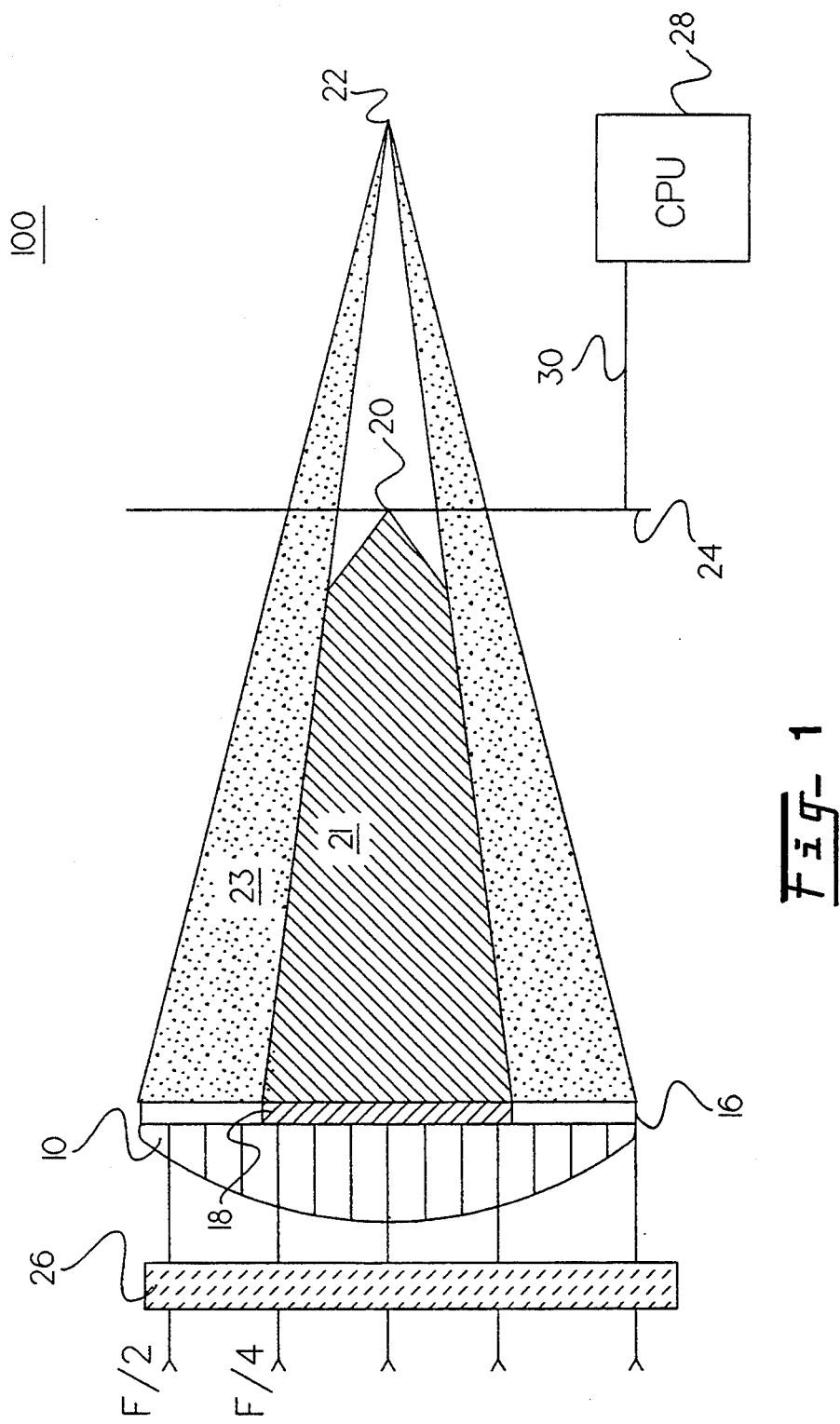
FIG. 1 shows a schematic diagram of a side view of a two color dispersive multicolor filter of the invention.
Figure 2:
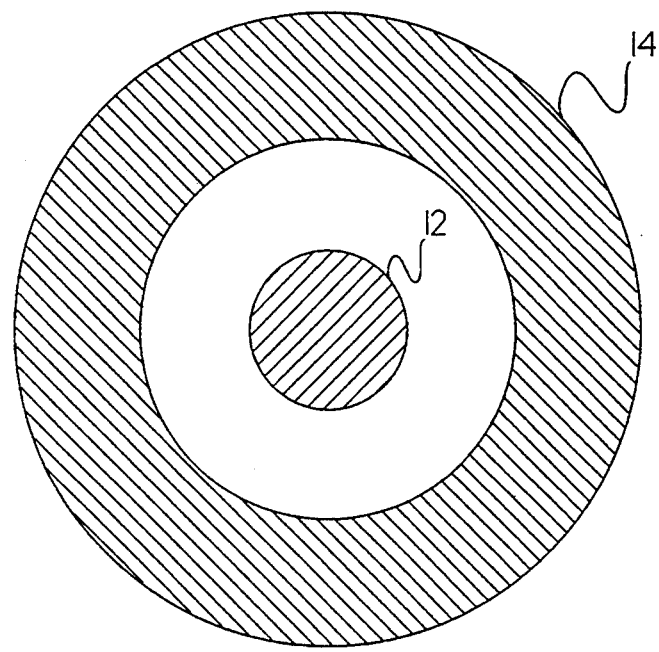
FIG. 2 shows a schematic diagram of the point spread function of a two color dispersive multicolor filter of the invention.

Now referring to FIGS. 1 and 2, FIG. 1 shows a schematic diagram of a cutaway side view of one embodiment of a two color dispersive multicolor filter constructed according to the invention. FIG. 2 shows a schematic diagram of the point spread function of the two color dispersive multicolor filter of the invention.

The multicolor filter of the invention is used with a camera 100 which comprises a dispersive lens 10 with physical and performance characteristics similar to a typical camera lens. The camera 100 further comprises an aperture 16 having a central obscuration 18. Band pass spectral filters 26 are positioned in front of the dispersive lens 10 such that images from objects of interest pass through the band pass spectral filters. The filtered images then radiate through the dispersive lens 10 and are centrally obscured by central obscuration 18. Information representing the scene may then be read from a focal plane array 24.

Those skilled in the art will recognize that in a typical camera with a standard lens, most of the energy within the infrared (IR) band is focused into an approximately 2 mill diameter spot. This corresponds to the 2 mill spacing of the individual detectors in the staring focal plane detector array 24. The spatial pattern of this spot is called the Point Spread Function (PSF) of the sensor. The PSF of a typical camera with its lens will be referred to here as a monocolor PSF since all of the input radiation within the spectral band of the camera is mixed together to form this one PSF.

In one example application of the invention radiation from a point target enters the dispersive lens 10. The image from the point target may be divided between plume band energy and guard band energy. The plume band energy being more concentrated at the center of a blur circle and the guard band energy surrounding the plume band energy at an annulus.

In one example embodiment of the invention the dispersive lens 10 creates a two color point spread function (two color PSF) of an object on an image plane. Plume band energy 21 from a point target may be focused into an approximately 2 mill diameter blur circle 12. Guard band energy 23 may be focused into an annulus region 14 which surrounds the blur circle 12. Individual plume band and guard band signatures of the target are then recovered by following a spatial filtering method described below.

In one embodiment of the invention the band pass spectral filters 26 are selected to pass only plume band radiation 21 and guard band radiation 23. The central obscuration 18 passes plume band radiation 21 but blocks guard band radiation 23. The dispersive lens 10 brings the plume band radiation 21 to a sharp focus at one predetermined focal point, at the plume focal point 20. The dispersive lens 10 brings the guard band radiation 23 to a sharp focus at a second predetermined focal point, at the guard focal point 22. The plume focal point 20 may be slightly different than the guard focal point 22.

A radiation detector such as the focal plane array detector 24 may be located at the plume focal point 20 to detect sharply focused plume band radiation 21. The focal plane array detector 24 may advantageously be a single color photodetector array. The annulus of slightly out-of-focus guard radiation 14 also falls on the focal plane array detector 24. This camera image 15 comprises the plume radiation 12 and guard radiation 14. The camera image 15 is converted into equivalent electrical signals 30 in a well known manner. The signals 30 are representations of the camera image 15 and are processed by a computer 28 in one embodiment. Those skilled in the art will appreciate that other apparatus and methods, such as digital signal processing methods, may be used to perform the signal processing of signals 30.

The computer 28 performs a two channel spatial filter operation on the camera image signals 30. The camera image 15 comprises both the two color PSF from the point target and background clutter. In one embodiment the spatial filter is matched to the two color PSF and the background clutter. The spatial filter recovers independent, high resolution plume band and guard band images.

In operation the dispersive lens 10 focuses plume band energy 21 onto the 2 mill central spot 12. The guard band energy 23 may be focused into an annulus ring 14 concentric with the central spot 12. All other energy in the input radiation, to which the camera 100 might otherwise respond, may be strongly attenuated by a spectral filter 26 within the lens 10.

The multicolor filter of the invention exploits the dispersive property of the lens 10. Normally, a lens is designed to compensate for dispersion so that a sharp focus is achieved for the entire spectral band of interest at one focal distance. The dispersive lens 10 may be specially designed to provide sharp focus of the plume band radiation 21 at one focal distance 20 and sharp focus of the guard band radiation 23 at a slightly different focal distance 22. Those skilled in the art will appreciate that various techniques exploiting the natural dispersion of lens material, or by means of a diffractive lens in which the ray-bending is effected by guiding lines ruled on the lens surface, may be used to construct dispersive lens 10.

The central part 18 of the effective lens aperture 16 may be obstructed. This leads to the formation of a two-color PSF. In one embodiment of the invention the diameter of the central spot 12 is about 2 mills and the inside diameter of the annulus 14 is about 3 mills with an outside diameter of about 6 mills. The form of the PSF is determined by the effective lens aperture 16.

The image 15 formed at the focal plane 24 of the camera by this PSF is processed by a pair of orthogonal spatial filters to independently recover, from the background clutter, a target-enhanced plume band image and a target-enhanced guard band image. The pair of orthogonal filters may advantageously be matched to the two-color PSF and to the expected characteristics of the background clutter.

The optimum detection of a point target against clutter may preferably be accomplished by spatial filtering. The spatial filtering method of the invention will now be described. The camera image 15, symbolized as CAMERA, may be convolved by the computer 28 with a spatial filter specified as an array of numbers, or weights, symbolized as FILTER, to form the output image OUTPUT:

The spatial filter may be optimally designed to satisfy two constraints:
- Pass the target image shape that is the point spread function PSF at unity gain (i.e., PSF * FILTER = 1).
- Minimize the variance of the filter output when the input is the expected clutter.

A single target-enhanced image of a point target may be conventionally derived by processing the camera output 30 with a spatial filter matched to the single color PSF of the sensor and the characteristics of the expected clutter.

The camera image is, symbolized as CAMERA, read out from the array 24 may be processed by a pair of orthogonal spatial filters to independently recover the plume image 12 and guard image 14.

A conventional spatial filter may be optimally designed to satisfy the two constraints of unity target gain and minimum output variance when the-input is clutter. Each of the two spatial filters are optimally designed to satisfy these same constraints, and the additional constraint that the filters be orthogonal. That is, the plume filter should have zero gain for a guard-target shape and the guard filter should have zero gain for a plume-target shape.

When the two-color PSF forms a central circle 12 with a concentric annulus 14, the third, zero-crosstalk, constraint may be very weak. That is, it is approximately satisfied by filters designed to the first two constraints. This particular form of the two-color PSF provides inherently low crosstalk.

In order to illustrate the filter method outlined above, a simulation will be described. For the purpose of the simulation, it was assumed that the PSF of plume band energy 21 is symbolized as TARGET, and the PSF of guard band energy 23 is symbolized as BLUR.

The plume spectral filter is designed to:
- Pass TARGET at unity gain
- Provide zero crosstalk from BLUR
- Suppress DC and low frequency clutter.

The filter symbolized as PLUMFILTER has been selected according to these criteria. The guard spatial filter is designed to:
- Pass BLUR at unity gain
- Provide zero crosstalk from TARGET
- Suppress DC and low frequency clutter.

The filter symbolized as GUARDFILTER has been selected according to these criteria.

The Dispersive Multicolor Filter derives simultaneous coregistered two color information from a monocolor staring sensor with no moving parts.

The two spectral bands are separated by causing the point spread function (PSF) of the sensor to be radically different for the two bands. The actual location of the bands may be anywhere within the bandpass of the sensor, and their specific location and width are predetermined according to the intended application of the system.

The two different PSF's effectively encode the guard band 23 and plume band 21 components of the object scene into the spatial domain of the single image 15 that is read out from the sensor 24. A two channel spatial filter decodes, and thereby individually recovers, the two spectral band images.

Symbolically the plume band image and guard band image may be represented by the following equations:
Plume_Band_Image=Sensed_Image * Plume_Band_Spatial_Filter   Guard_Band_Image=Sensed_Image * Guard_Band_Spatial_Filter   The invention provides two color information, with no moving parts, in every frame.

When the two spectral bands are widely separated, e.g., the 3–5 micron MW and 8–12 micron LW bands, the method of the invention may provide the additional advantage of simplifying optics. In a conventional system the optics must sharply focus the image over the entire 3–12 micron band, which is a difficult design requirement. The present invention specifically requires that one band, e.g. the 8–12 micron band, be out of focus.

In one embodiment of the invention the objective is point target detection. To implement point target detection the spatial filters are designed so that the individual images of the object scene are recovered to emphasize point objects and all other clutter detail is suppressed.

The following describes the operation of the two channel spatial filter that decodes the two-band information encoded into the sensed image by the DMF.

Generally, the imaging performed by a staring optical sensor may be defined in terms of an array of numbers, PSF(i,j), called the Point Spread Function (PSF). The PSF is the image that is read out from the staring sensor when the input to the sensor is an unresolved point target. The width, for example, of PSF(i,j) is a measure of the optical blur of the sensor.

The object scene being viewed may be represented by the image array OBJECT(x,y). The image, IN(x,y), generated by the sensor when viewing this object is then obtained by convolving the object OBJECT(x,y) with the PSF of the sensor PSF(i,j):

$$IN(x,y) = OBJECT(x,y) * PSF(i,j) \tag{1}$$

where '*' symbolizes convolution throughout. The object scene OBJECT(x,y) may be represented as the sum of two arrays:

$$OBJECT(x,y) = OBJECT\_G(x,y) + OBJECT\_P(x,y) \tag{2}$$

where OBJECT_G (x, y) is the object scene as it appears via guard band radiation 23 and OBJECT P (x,y) as it appears by the plume band radiation 21.

With the dispersive optics and apodized lens 10 as utilized by the dispersive multicolor filter (DMF), the PSF formed by plume band radiation 21 is different from that formed by guard band radiation 23. These two PSF's may be represented by the arrays PSF_G (i,j) (guard) and PSF_P(i,j) (plume).

The image IN(x,y) formed by, and read out from, the sensor in this case is thus:

$$IN(x,y) = OBJECT\_G(x,y) * PSF\_G(x,y) +$$
$$OBJECT\_P(x, y) * PSF\_P(x,y) \tag{3}$$

The function of the two channel spatial filter is to recover individual plume band and guard band images from this single sensed image IN(x,y).

In order to introduce the concept of the two channel spatial filter, the case of a conventional single channel spatial filter will be considered first.

A single channel spatial filter is well known. The filter is defined as an array (e.g. 5×7) of filter weights F (i,j). It is applied to the digitized image IN(x,y), where x,y are integral pixel values and IN(x,y) is the intensity of the X, $y^{th}$ pixel. The image after spatial filtering is OUT(x,y). The filtering action is a convolution of the image IN(x,y) with the filter F(i,j):

$$OUT(x,y) = IN(x,y) * F(i,j) \tag{4}$$

Substituting for IN(x,y) from equation 1

$$OUT(x,y) = OBJECT(x,y) * PSF(i,j) * F(i,j)$$

That is,

OUT(x,y) = OBJECT(x,y) * PF(i,j)

where PF(i,j) is the convolution of the spatial filter F(i,j) with the Point Spread Function of the sensor PSF(i,j):

$$PF(i,j) = PSF(i,j) * F(i,j) \quad (5)$$

A single channel spatial filter (F(i,j)) may typically be chosen to process the sensed image so as to optimize the output image OUT(x,y) according to some optimization criteria. For example, if the object image OBJECT(x,y) contains a single point target against a general clutter background, the filter F(i,j) might be chosen, in association with the Point Spread Function PSF(i,j), so that the output image OUT(x,y) may:
(1) show a point target at unity gain; and
(2) minimize the output when the input is clutter.
This particular criterion maximizes the ability to detect the point target against its clutter background.

The unity target gain specification requires that in the convolution PF(i,j), of PSF(i,j) with the spatial filter F(i,j), the central pulse must have unity value. That is, $$PF(0,0) = 1$$

Consider the case of a sensor fitted with the DMF optics viewing a composite object scene made up of guard band radiation (OBJECT_G(x,y)) and plume band radiation (OBJECT_P(x,y)). The sensor generates only a single sensed image IN(x,y) as given by equation 2. To recover individual plume and guard band images OUT_G(x,y) and OUT_P(x,y), the sensed image IN(x,y) is processed by two spatial filters. These two filters may be represented as the arrays F_G(i,j) (guard band) and F_P(i,j) (plume band). The images recovered from IN(x,y) by these two spatial filters are OUT_G(i,j) and OUT_P(i,j) where $$OUT\_G(x,y) = IN(x,y) * F\_G(i,j) \quad (6)$$

$$OUT\_P(x,y) = IN(x,y) * F\_P(i,j) \quad (7)$$

Substituting in equation 6 from equation 3 for IN(x,y):

$$\begin{aligned}OUT\_G(x,y) &= [\,OBJECT\_G(x,y) * PSF\_G(i,j) + \\ &\quad OBJECT\_P(x,y) * PSF\_P(i,j)\,] * F\_G(i,j) \\ &= OBJECT\_G(x,y) * PF\_GG(i,j) + \\ &\quad OBJECT\_P(x,y) * PF\_PG(i,j)\end{aligned}$$

where, $$PF\_GG(i,j) = PSF\_G(i,j) * F\_G(i,j)$$

(PF_GG(i,j) is the convolution of the guard band PSF with the guard band spatial filter) and $$PF\_PG(i,j) = PSF\_P(i,j) * F\_G(i,j)$$

(PF_PG(i,j) is the convolution of the plume band PSF with the guard band spatial filter)

Similarly, substituting in equation 7 from equation 3 for IN(x,y)

$$\begin{aligned}OUT\_P(x,y) &= [\,OBJECT\_G(x,y) * PSF\_G(i,j) + \\ &\quad OBJECT\_P(x,y) * PSF\_P(i,j)\,] * F\_P(i,j) \\ &= OBJECT\_G(x,y) * PF\_GP(i,j) + \\ &\quad OBJECT\_P(x,y) * PF\_PP(i,j)\end{aligned}$$

where $$PF\_GP(i,j) = PSF\_G(i,j) * F\_P(i,j)$$

(PF_PG(i,j) is the convolution of the guard band PSF with the plume band spatial filter) and $$PF\_PP(i,j) = PSF\_P(i,j) * F\_P(i,j)$$

(PF_PP(i,j) is the convolution of the plume band PSF with the plume band spatial filter)

The individual guard band and plume band images are recovered as OUT_G(x,y) and OUT_P(x,y) from the object scene:

$$\begin{aligned}OUT\_G(x,y) &= OBJECT\_G(x,y) * PF\_GG(x,y) + \\ &= OBJECT\_P(x,y) * PF\_PG(x,y) \\ \\ OUT\_P(x,y) &= OBJECT\_G(x,y) * PF\_GG(x,y) + \\ &= OBJECT\_P(x,y) * PF\_PP(x,y)\end{aligned} \quad (8)$$

Equation 8 is the two-channel version of equation 4. where $$\begin{aligned}PG\_GP(i,j) &= PSF\_G(i,j) * F\_P(i,j) \\ PF\_PP(i,j) &= PSF\_P(i,j) * F\_P(i,j) \\ PF\_GG(i,j) &= PSF\_G(i,j) * F\_G(i,j) \\ PF\_PG(i,j) &= PSF\_P(i,j) * F\_G(i,j)\end{aligned} \quad (9)$$

Equation 9 is the two-channel version of equation 5.

In the conventional single channel case the spatial filter P(i,j) is chosen in conjunction with the Point Spread Function PSF(i,j) so as to pass a point target at unity gain while maximally suppressing clutter.

In the two channel case, the two spatial filters F_G(i,j) and F_P(i,j) are chosen in conjunction with the two point spread functions PSF_G(i,j) and PSF_P(i,j), to maximally suppress clutter and to:
pass a point target in OBJECT_G(x,y) at unity gain in OUT_G(x,y)
pass a point target in OBJECT_P(x,y) at unity gain in OUT_P(x,y)
and also to
maximally attenuate a point target in OBJECT_G(x,y) in OUT_P(x,y)
maximally attenuate a point target in OBJECT_P(x,y) in OUT_G(x,y)

In other words, the filter design requirements are the same as in the conventional single channel case with the additional requirement of minimum target cross-talk (plume-to-guard and guard-to-plume).

The unity target gain specification requires that in the convolution of the guard band PSF PSF_GP(i,j) with the guard band spatial filter F_G(i,j) the central pulse must have unity value, and similarly for the plume band. That is:

$$PF\_GG(0,0) = 1$$

$$PF\_PP(0,0) = 1$$

The zero target cross talk specification requires that in the convolution of the guard band PSF PSF_G(i,j) with the plume band spatial filter F_P(i,j) the central pulse must have zero value, and similarly for the plume band convolution. That is,

PF_GP(0,0)=0

PF_PG(0,0)=0

FIGS. 3 and 4 show the spread functions of a simulated DMF sensor for plume band (PSF_P(i,j)) and guard (PSF_G(i,j)) input radiation respectively.

FIGS. 5 and 6 respectively show a plume band spatial filter (F_P(i,j)) and a guard band spatial filter (F_G(i,j)) that were designed to pass point targets at unity gain, optimally suppress clutter, and have zero target crosstalk.

FIGS. 7A, 7B, 7C and 7D show the four convolutions between the two PSF's and the two spatial filters as detailed in equation 9. These convolutions show that the unity target gain and zero target cross talk specifications have been achieved.

Figure 7B:
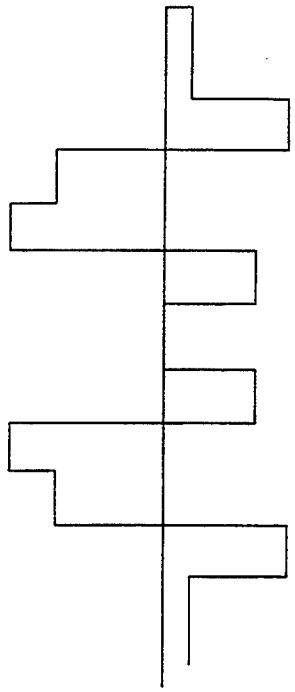
FIGS. 7A, 7B, 7C and 7D show graphs of four convolutions between two point spread functions and two spatial filters.
Figure 7D:
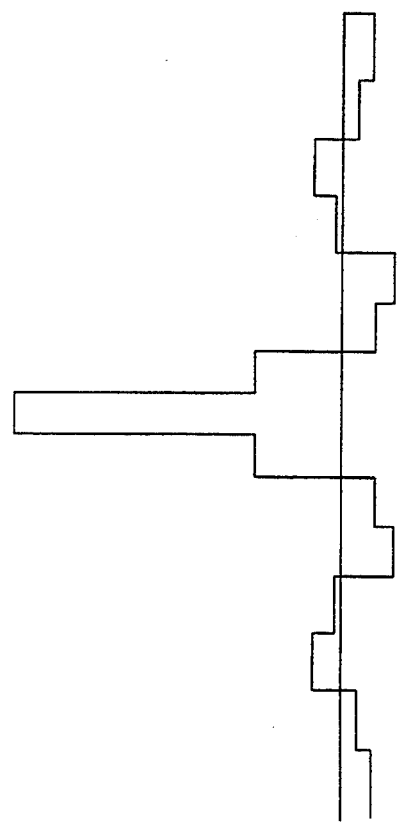
Figure 7A:
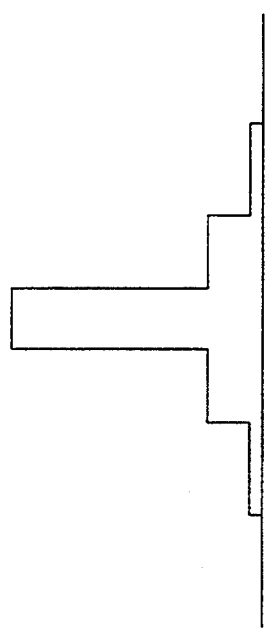

FIGS. 7A and 7D have a unit-value central pulse amplitude. This shows that the DMF sensor with two channel spatial filtering yields unity target gain for a point target input (PF_GG(0,0)=1, PF_PP(0,0)=1).

Figure 7C:
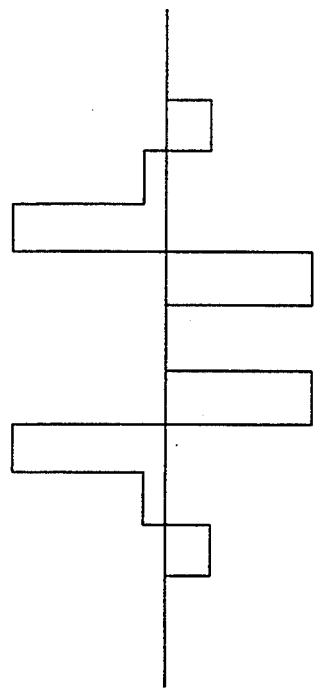

FIGS. 7B and 7C have a zero amplitude central pulse amplitude. This shows that the DMF sensor with two channel spatial filtering yields zero cross talk for point target inputs. The plume band signal from a guard band point target is zero at the nominal target position, and vice versa (PF_GP(0,0)=0, PF_PG(0,0)=0).

There may be some cross-talk splash-over away from the nominal target position, but this is similar to the splash-over of single band energy into the single band image away from the nominal target position that is typical of PSF convolution with a spatial filter.

Both filters are designed to minimize non point-like detail (background clutter) in the object scene. However, by combining the two spectral bands 21, 23 into one image 15, the amount of clutter leakage is inevitably greater than if the sensor system were designed to operate in only one spectral band. In other words, some guard band clutter may appear in the plume band image and vice verse. However, analysis has shown that relatively little additional clutter leakage occurs, particularly in the plume band channel (which has the conventional type of PSF).

The DMF technique provides an important benefit of simultaneous co-registered sensing of two spectral bands 21, 23 using a standard mono-color sensor 24, with no moving parts and with minimal loss of detection performance relative to single band operation.

Interpixel target positions on the focal plane detector array 24 are discerned by measuring the relative intensities in the neighborhood of each of the initial threshold crossing signals of the target enhanced plume image 12. These points may be analyzed to estimate the approximate inter-pixel position of the target point. Two-channel spatial filter kernels may be predesigned, not just for targets exactly centered on a pixel, but also for a small number, in one embodiment four, of possible interpixel target positions. The appropriate filter-kernel may be chosen, based upon the measured interpixel position of the target event. In this way, accurate two color information may be recovered for each target event no matter where the actual target location may be found on the focal plane detector array 24.

In operation the spatial filter attenuates the background clutter and passes point targets at unity gain. The present invention substantially minimizes the level of crosstalk between the recovered plume band 21 and the recovered guard band 23. In contrast with the prior art, the invention uses a single color photodetector array 24 to provide multicolor images.

In one preferred embodiment of the invention the apparatus of the invention may be operated in real time. In a real time operational application, conventional spatial filtering may be performed on the plume-component of the two channel spatial filter. The resulting target enhanced plume image may be dynamically thresholded to isolate a relatively small number of potential targets defined as threshold crossing signals.

Dynamic thresholding is applied to the residue (RES(x,y)) remaining after spatial filtering to identify target-like pixels in the residue image. The spatial filter is designed to maximally attenuate clutter and noise while passing any targets without attenuation.

In dynamic thresholding, the detection threshold (THR (x,y)) at the current pixel (x,y) is set according to an estimate (SD (x,y)) of the standard deviation of the clutter at the current pixel:

$$THR(x,y) = K * SD(x,y)$$

The standard deviation (THR (x,y)) is estimated by assuming that the clutter is uniform over a region of about $11 \times 11$ pixels surrounding the current pixel (x,y). On this assumption, the standard deviation is computed over this window region. For example (for an $11 \times 11$ window (121 pixels) with a $3 \times 3$ cut-out (9 pixels)):

$$SD(x,y) = SQRT \{ SUM[R(u,v)^2]/112 \}$$
$$u - x = -11 \text{ to } -2 \text{ and } 2 \text{ to } 11$$
$$v - y = -11 \text{ to } -2 \text{ and } 2 \text{ to } 11$$

If a target is present at the current pixel, the $3 \times 3$ cut out prevents its intensity from contaminating the standard deviation estimate.

The value of K is generally held constant over one image. It is adjusted from frame-to-frame so as to keep the detection threshold as low as possible, for maximum target-detection sensitivity, while keeping the number of false alarms at an acceptable level. For example, K might have a value of six: a false-alarm, reside-induced, threshold crossing is relatively unlikely at six-times the standard deviation of the residue.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A multicolor radiation detecting apparatus comprising:
   (a) a base having a lens mount and a radiation sensor mount;
   (b) a dispersive lens means for focusing radiation of a first selected band at a first focus and focusing radiation of a second selected band at a second focus, wherein the dispersive lens means is attached to the lens mount, wherein the dispersive lens means further has a central obscuration of a predetermined size, and wherein the central obscuration passes radiation of the first selected band;

(c) a radiation sensor means for detecting an image attached to the radiation sensor mount at a predetermined distance from the dispersive lens means disposed to receive radiation of the first selected band and the second selected band, wherein the radiation sensor means further has an image output; and (d) spatial filter processing means for spatially filtering the image connected to the image output.

2. The multicolor radiation detecting apparatus of claim 1 further comprising a spectral filter means for filtering selected bands of radiation.

3. The multicolor radiation detecting apparatus of claim 1 where the dispersive lens means focuses the first selected band in a central location and the dispersive lens means focuses the second selected band in an annulus ring substantially concentric with the central location.

4. The multicolor radiation detecting apparatus of claim 1 wherein the first selected band is focused on the radiation sensor means at substantially a point.

5. The multicolor radiation detecting apparatus of claim 1 wherein the first selected band and the second selected band further comprise a plume band and a guard band.

6. The multicolor radiation detecting apparatus of claim 1 wherein the radiation sensor means further comprises at least one focal plane array.

7. The multicolor radiation detecting apparatus of claim 1 wherein the spatial filter processing means further includes a two channel spatial filter.

8. The multicolor radiation detecting apparatus of claim 7 wherein the two channel spatial filter is matched to a two color point spread function.

9. The multicolor radiation detecting apparatus of claim 1 wherein the spatial filter processing means further passes radiation of the first selected band at unity gain and the spatial filter processing means further passes radiation of the second selected band at zero gain to generate a first color signal, and wherein the spatial filter processing means further passes radiation of the first selected band at zero gain and the spatial filter processing means further passes radiation of the second selected band at unity gain to generate a second color signal.

10. The multicolor radiation detecting apparatus of claim 1 wherein the radiation sensor means provides a two dimensional array of sensed image data, and wherein the spatial filter processing means further provides at least two, two dimensional arrays of filter coefficients, and wherein the spatial filter processing means further convolves the two dimensional array of sensed image data with each of the at least two, two dimensional arrays of filter coefficients.

11. The multicolor radiation detecting apparatus of claim 1 wherein the at least two, two dimensional arrays of filter coefficients are orthogonal.

12. An imaging apparatus comprising:
(a) a base having a filter mount, a lens mount and a radiation sensor mount;
(b) a spectral filter means for passing two selected bands of radiation, wherein the spectral filter means is attached to the filter mount;
(c) a dispersive lens attached to the base for receiving the two selected bands of radiation wherein the dispersive lens further comprises a central obscuration and focuses a first selected band at a first focal distance and focuses a second selected band at a second focal distance;
(d) a focal plane array attached to the base at the radiation sensor mount at the first focal distance from the dispersive lens, wherein the focal plane array receives radiation from the dispersive lens of the first selected band and the second selected band, wherein the focal plane array further includes an image output; and
(e) spatial filter processing means for spatially filtering an image connected to the image output.

13. The imaging apparatus of claim 12 where the dispersive lens focuses the first selected band in a central location and the dispersive lens focuses the second selected band in an annulus ring substantially concentric with the central location.

14. The imaging apparatus of claim 12 wherein the first selected band and the second selected band further comprise a plume band and a guard band.

15. The imaging apparatus of claim 12 wherein the spatial filter processing means further includes a two channel spatial filter.

16. The imaging apparatus of claim 15 wherein the two channel spatial filter is matched to a two color point spread function.

17. The imaging apparatus of claim 12 wherein the spatial filter processing means further passes radiation of the first selected band at unity gain and the spatial filter processing means further passes radiation of the second selected band at zero gain.

18. The imaging apparatus of claim 12 wherein the spatial filter processing means further passes radiation of the first selected band at zero gain and the spatial filter processing means further passes radiation of the second selected band at unity gain.

19. The imaging apparatus of claim 12 wherein the focal plane array provides a two dimensional array of sensed image data, and wherein the spatial filter processing means further provides a first two dimensional filter array of first color filter coefficients and a second two dimensional filter array of second color filter coefficients, and wherein the spatial filter processing means further convolves the two dimensional array of sensed image data with the first two dimensional filter array and the spatial filter processing means further convolves the two dimensional array of sensed image data with the second two dimensional filter array.

20. The imaging apparatus of claim 19 wherein the first two dimensional filter array and second two dimensional filter array are orthogonal to each other.

21. A dispersive multicolor filter apparatus for deriving two color information for point target detection, the apparatus comprising:
(a) a base;
(b) a spectral filter means attached to the base for passing two selected bands of radiation;
(c) a dispersive lens attached to the base for receiving the selected bands of radiation wherein the dispersive lens further comprises a central obscuration and focuses a first selected band at a first focal distance and focuses a second selected band at a second focal distance;
(d) a focal plane array attached to the base at the first focal distance from the dispersive lens disposed to receive the first selected band at a central location and the second selected band at an annulus ring concentric with the central location from the dispersive lens; and (e) spatial filter processing means connected to receive a photo signal from the focal plane array for recovering a first selected band image and a second selected band image.

22. The dispersive multicolor filter apparatus of claim 21 wherein the spatial filter processing means further comprises a digital computer.

* * * * *

UNITED STATES PATENT AND TRADEMARK OFFICE
CERTIFICATE OF CORRECTION

PATENT NO. : 5,444,236
DATED : August 22, 1995
INVENTOR(S) : David Ludington et al.

It is certified that error appears in the above-identified patent and that said Letters Patent is hereby corrected as shown below:

Col. 2, line 37, delete the word ".then" and replace it with -- then --.

Col. 4, line 59, delete the ":" and replace it with a -- . --.

Col. 5, lines 57-60, the phrase:

"Plume_Band_Image=Sensed_Image * Plume_Band_Spatial_Filter Guard_Band_Image=Sensed_Image * Guard_Band_Spatial_Filter The invention provides two color information, with no moving parts, in every frame."

should be broken into separate sentences as follows:

-- Plume_Band_Image = Sensed_Image * Plume_Band_Spatial_Filter
Guard_Band_Image = Sensed_Image * Guard_Band_Spatial_Filter The invention provides two color information, with no moving parts, in every frame. --

UNITED STATES PATENT AND TRADEMARK OFFICE
CERTIFICATE OF CORRECTION

PATENT NO. : 5,444,236
DATED : August 22, 1995
INVENTOR(S) : David Ludington et al.

It is certified that error appears in the above-identified patent and that said Letters Patent is hereby corrected as shown below:

Col. 6, lines 30-31, change equation (2) from:

"OBJECT (x,y)=OBJECT_G(x,y)+OBJECT_P(x,y)"

to read:

-- OBJECT(x,y) = OBJECT_G(x,y) + OBJECT_P(x,y) --

Col. 6, line 34, delete the phrase "OBJECT P" and replace it with -- OBJECT_P --.

Col. 7, line 40, equation (6), delete "ZN" and replace it with -- IN --.

Col. 8, line 18, equation (8), delete the second and fourth occurrence of the "=".

Col. 8, line 28, equation (9), delete the first two letters "PG" and replace them with -- PF --.

Signed and Sealed this

Twenty-sixth Day of March, 1996

Attest:

BRUCE LEHMAN

*Attesting Officer*          *Commissioner of Patents and Trademarks*